(12) United States Patent
Sasajima (10) Patent No.: US 6,915,206 B2
(45) Date of Patent: Jul. 5, 2005

(54) MAP DATA DISTRIBUTION SYSTEM AND NAVIGATION APPARATUS

(75) Inventor: Akihiko Sasajima, Tokyo (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 10/611,008

(22) Filed: Jul. 1, 2003

(65) Prior Publication Data

US 2004/0117110 A1 Jun. 17, 2004

(30) Foreign Application Priority Data

Jul. 5, 2002 (JP) ...................................... 2002-196615

(51) Int. Cl.[7] .............................................. G01C 21/30
(52) U.S. Cl. ...................... 701/208; 701/209; 701/211; 340/990; 340/995.12; 340/995.19
(58) Field of Search ...................... 701/24–26, 200–201, 701/207–213; 340/988–993, 995.1, 995.11, 955.12, 995.18, 995.19, 995.23; 455/414.1, 414.2, 414.3, 456.1–457; 342/357.01, 357.09, 357.1, 357.17

(56) References Cited

U.S. PATENT DOCUMENTS

| | | | | |
|---|---|---|---|---|
| 6,272,332 B1 | * | 8/2001 | Matsumoto et al. | ..... 455/412.1 |
| 6,324,467 B1 | * | 11/2001 | Machii et al. | ............... 701/200 |
| 6,477,526 B2 | * | 11/2002 | Hayashi et al. | ................. 707/4 |
| 6,532,417 B2 | | 3/2003 | Hatano | ........................ 701/207 |
| 6,563,459 B2 | * | 5/2003 | Takenaga | .................. 342/357.1 |
| 2001/0044802 A1 | * | 11/2001 | Hirono | ..................... 707/104.1 |
| 2002/0059296 A1 | * | 5/2002 | Hayashi et al. | .......... 707/104.1 |
| 2003/0028322 A1 | * | 2/2003 | Ogawa | ........................ 701/213 |
| 2003/0191580 A1 | * | 10/2003 | Endo et al. | .................. 701/202 |
| 2003/0220981 A1 | * | 11/2003 | Nakamura et al. | .......... 709/217 |
| 2004/0034468 A1 | * | 2/2004 | Kobayashi et al. | ......... 701/205 |

* cited by examiner

Primary Examiner—Jacques H. Louis-Jacques
(74) Attorney, Agent, or Firm—Brinks Hofer Gilson & Lione (57) ABSTRACT

A map data distribution system includes a navigation apparatus and a map distribution server. The navigation apparatus is connected to the map distribution server through a predetermined network. The navigation apparatus transmits a distribution request to the map distribution server. The distribution request includes distribution conditions relating to the amount of map data to be distributed. The map distribution server transmits area information to the navigation apparatus. The area information shows a geographical area of the map data that is transmittable under the distribution conditions. The navigation apparatus displays, in accordance with the transmitted area information, a map area of the map data transmittable in a single distribution operation under the distribution conditions and superimposes it on the map. The navigation apparatus transmits a downloading instruction in which one or more map areas are specified by a user to the map distribution server. The navigation apparatus downloads predetermined map data.

14 Claims, 5 Drawing Sheets

MAP DATA DISTRIBUTION SYSTEM AND NAVIGATION APPARATUS

BACKGROUND

1. Field of the Invention

The present invention relates to a map data distribution system for distributing map data through a network and to a navigation apparatus for receiving distributed map data and for performing navigation operations such as displaying a map and the like.

2. Description of the Related Art

In general, in-vehicle navigation apparatuses have various functions, such as a map display function for displaying a map around the position of a vehicle on a display screen, a route search function for searching for a route to a destination designated by a user, a route guidance function for guiding the vehicle to travel along the route found by the route searching, and a point-of-interest (POI) information function for displaying symbols showing various points of interest at positions on the map and for displaying information relating to the points of interest. Normally, predetermined processing is performed using map data provided through a disc medium, such as a digital video disc (DVD) or a compact disc (CD), in order to realize such functions.

The content of the map data described above is appropriately updated by a particular manufacturer or the like that produces and maintains the map data, so that the map data reflects the latest road information. Although the updated map data can be obtained by purchasing the latest DVD or the like, downloading only an updated part of the map data through a communication link is also possible these days.

In the conventional system for obtaining updated map data through a communication link, a predetermined unit of map data is prepared by a map distribution server that provides map data and is distributed. Thus, users of the navigation apparatuses cannot always obtain map data under distribution conditions desired by the users. For example, map data for update is prepared for each map section created by dividing by predetermined latitude and longitude. Each piece of map data for update is transmitted in accordance with a distribution instruction from the navigation apparatus. As a result of this, distribution may need a longer time than the users expect and unnecessary map data corresponding to areas not required by the users may be distributed. The map data includes different types of data, such as map image data, road data, and point-of-interest (POI) data. Even if a user desires to obtain, for example, only the latest map image data, the road data and the POI data included in the same map section are also transmitted. Therefore, the user needs to spend time and money for receiving all the data included in the same map section.

SUMMARY OF THE INVENTION

The present invention is designed with respect to the points described above. An object of the present invention is to provide a map data distribution system and a navigation apparatus that provide a user with map data under the conditions desired by the user.

In order to achieve the above-mentioned object, a map data distribution system according to the present invention includes a navigation apparatus and a map distribution server, and the navigation apparatus is connected to the map distribution server through a predetermined network. The navigation apparatus includes a distribution request transmitting section and a map data receiving section. The distribution request transmitting section transmits a distribution request to the map distribution server. The distribution request includes distribution conditions relating to the amount of map data to be distributed. The map data receiving section receives the map data that satisfies the distribution conditions and that is sent in accordance with the distribution request. The map distribution server includes a map data transmitting section. The map data transmitting section transmits the map data satisfying the distribution conditions included in the distribution request. Thus, the navigation apparatus transmits the distribution request including the distribution conditions, so that the map data satisfying the distribution conditions can be distributed from the map distribution server. Therefore, users can obtain map data under desired conditions. In particular, the distribution amount designated in the distribution conditions determines the desired amount of data and desired communication time and thus allows the users to obtain only the necessary map data.

Preferably, the map distribution server further includes an area information transmitting section. Before the map data transmitting section transmits the map data, the area information transmitting section transmits area information showing a geographical area of the map data that is transmittable under the distribution conditions. Also, preferably, the navigation apparatus further includes an area information displaying section. The area information displaying section visually displays the geographical area of the map data that is receivable under the distribution conditions, in accordance with the area information transmitted from the map distribution server. Thus, the user can visually understand a geographical area corresponding to map data satisfying the distribution conditions. Therefore, prior to the actual distribution, the user can ascertain if the map data to be distributed satisfies the user's request.

Preferably, the navigation apparatus further includes a distribution instruction transmitting section. When an instruction to distribute the map data is given by the user after the displaying processing is performed by the area information displaying section, the distribution instruction transmitting section transmits the distribution instruction to the map distribution server. Also, preferably, the map data transmitting section transmits the map data when receiving the distribution instruction. Thus, the actual distribution of the map data performed after the verification of the content of the distribution by the user prevents map data not required by the user from being wrongly distributed.

Preferably, the area information displaying section displays map area information showing a geographical area corresponding to the map data that is transmittable by a single transmission operation under the distribution conditions in such a manner that the map area information is superimposed on the map. Even if the distribution amount is designated, a geographical area of the map data that is actually obtainable significantly differs depending on the content of the map data. Thus, visually displaying the map area information showing the geographical area allows the user to ascertain if map data for a sufficient geographical area can be obtained under the designated distribution conditions. Therefore, distribution of the map data accurately reflecting the user's wishes can be realized.

Preferably, the map data transmitted from the map distribution server to the navigation apparatus is an update to map data held in the navigation apparatus. Distributing an update enables the content of the map data to be updated with a small amount of communication. Although the presence or absence of an update depends greatly on the geographical position, verifying the geographical area corresponding to the update to be distributed prior to distribution of the map data allows the user to ascertain if the necessary map data can be obtained. Accordingly, distribution of the map data that satisfies the user's wishes can be ensured.

Preferably, the update is classified into different types depending on their uses. Also, preferably, the area information displaying section displays the map area information and the type of the update. Thus, the user can ascertain more accurately if a distribution satisfying the user's wishes can be performed.

Preferably, the area information displaying section displays each area corresponding to the map area information in a color in accordance with the type of the update. Thus, the content of distribution can be ascertained easily.

DETAILED DESCRIPTION OF THE DRAWINGS AND THE PRESENTLY PREFERRED EMBODIMENTS

A map data distribution system according to the embodiments of the present invention will now be described with reference to the drawings.

Figure 1:
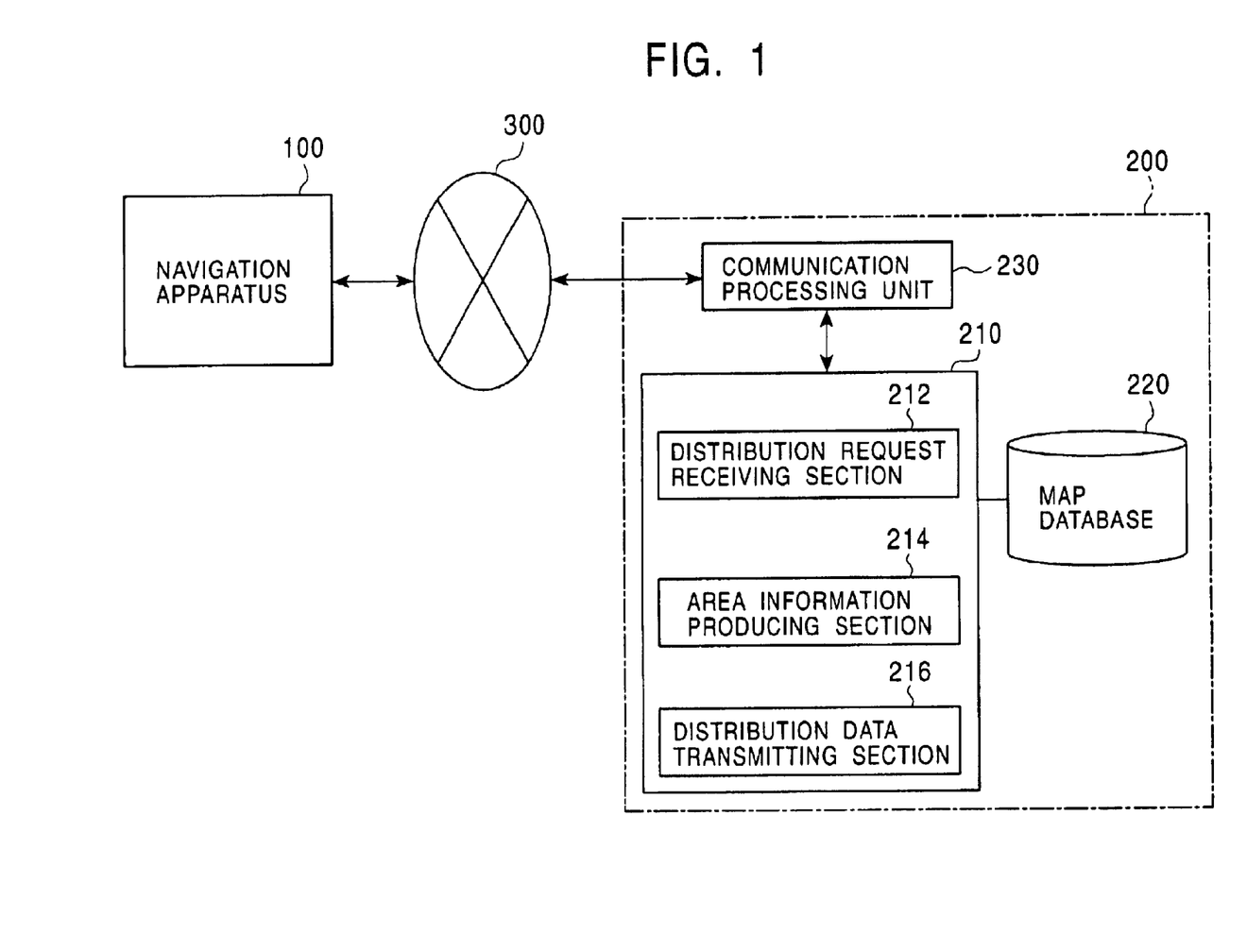
FIG. 1 shows the structure of a map data distribution system according to an embodiment of the present invention.

FIG. 1 shows the structure of a map data distribution system according to an embodiment of the present invention. The map data distribution system shown in FIG. 1 includes a navigation apparatus 100 mounted on a vehicle and a map distribution server 200 for providing an update to map data held in the navigation apparatus 100. The navigation apparatus 100 is connected to the map distribution server 200 through a predetermined network 300. The network 300 used in this embodiment includes various types of communication networks, such as a mobile telephone network and the Internet. The navigation apparatus 100 is connected to the network 300 through, for example, a mobile telephone (not shown) mounted in the vehicle.

Figure 2:
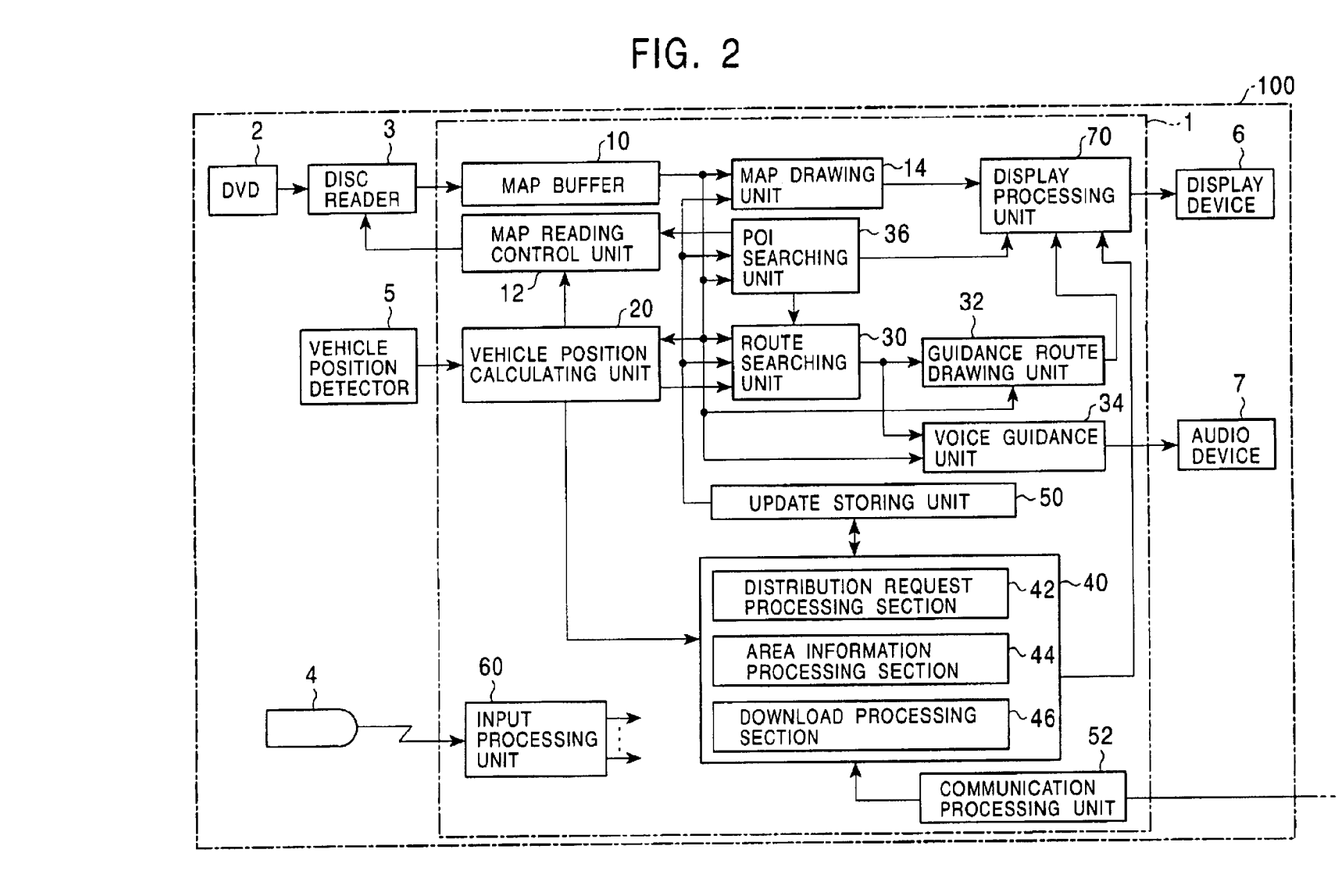
FIG. 2 shows the detailed structure of a navigation apparatus.

The detailed structure of the navigation apparatus 100 will now be described. FIG. 2 shows the detailed structure of the navigation apparatus 100. The navigation apparatus 100 shown in FIG. 2 includes a navigation controller 1, DVD(s) 2, a disc reader 3, a remote-control device 4, a vehicle position detector 5, a display device 6, and an audio device 7.

The navigation controller 1 controls the entire navigation apparatus 100. The navigation controller 1 executes a predetermined operation program using a central processing unit (CPU), a read-only memory (ROM), and a random-access memory (RAM).

The DVD 2 is an information recording medium, and map data required for performing various navigation operations, such as map display, point-of-interest (POI) searching, and route searching, is stored on the DVD 2. The map data includes map image data required for displaying a map, POI data required for searching for a point of interest, and road data required for searching for a route. Map data is divided by latitude and longitude into rectangular map sections with a predetermined size, which are stored on the DVD 2. Each piece of map data for the map sections is specified by designating a map section number, so that each piece of map data for the map sections can be read.

One or more DVDs 2 can be loaded into the disc reader 3. The navigation controller 1 controls the disc reader 3 to read the map data from one of the DVDs 2. The disc that is loaded into the disc reader 3 is not necessarily a DVD. A CD may be loaded into the disc reader 3. Alternatively, both a DVD and a CD may be selectively loaded into the disc reader 3.

The remote-control device 4 includes a joystick for designating directions, such as right, left, up, and down, numeric keys for entering numbers, and various operation keys, such as a "set key" for setting various types of settings. The remote-control device 4 transmits a signal to the navigation controller 1 in accordance with the operation thereof.

The vehicle position detector 5 includes, for example, a global positioning system (GPS) receiver, a direction sensor, and a distance sensor. The vehicle position detector 5 detects the position (latitude and longitude) of the vehicle and generates the detected data at predetermined intervals.

The display device 6 displays a map image around the position of the vehicle and various images, such as the results of nearby POI searching and the like, on the basis of drawing data supplied from the navigation controller 1. The audio device 7 outputs a guidance voice and the like in the vehicle cabin. The guidance voice is generated in accordance with a voice signal received from the navigation controller 1.

As shown in FIG. 2, the navigation controller 1 includes a map buffer 10, a map reading control unit 12, a map drawing unit 14, a vehicle position calculating unit 20, a route searching unit 30, a guidance route drawing unit 32, a voice guidance unit 34, a point-of-interest (POI) searching unit 36, a map data updating unit 40, an update storing unit 50, a communication processing unit 52, an input processing unit 60, and a display processing unit 70.

The map data read from the DVD 2 by the disc reader 3 is temporarily stored in the map buffer 10. The map reading control unit 12 supplies a request for reading map data within a predetermined area to the disc reader 3, in accordance with the vehicle position calculated by the vehicle position calculating unit 20 and an instruction from the input processing unit 60. The map drawing unit 14 performs drawing processing required for displaying a map image and produces map image drawing data in accordance with the map data stored in the map buffer 10.

The vehicle position calculating unit 20 calculates the position of the vehicle on the basis of the detected data supplied from the vehicle position detector 5. Also, if the calculated vehicle position is not on a road on the map, the vehicle position calculating unit 20 performs map matching to correct the position of the vehicle in accordance with the road network on the map and the travel route of the vehicle.

The route searching unit 30 searches for a travel route from a departure point to a destination point as a guidance route under predetermined search conditions. The guidance route drawing unit 32 produces guidance route drawing data for displaying the guidance route found by the route searching unit 30 so as to be superimposed on the map. The voice guidance unit 34 generates voice signals for intersection guidance and the like that are required for guiding the vehicle to travel along the guidance route found by the route searching unit 30. The POI searching unit 36 searches for a point of interest that satisfies search conditions designated by the user.

The map data updating unit 40 performs a series of processes to obtain an update for the currently held map data from the map distribution server 200. Here, the currently held map data includes map data that has already been distributed and received from the map distribution server 200, as well as the map data recorded on the DVD 2.

The map data updating unit 40 includes a distribution request processing section 42, an area information processing section 44, and a download processing section 46. The distribution request processing section 42 creates a distribution request including distribution conditions relating to the amount of map data to be distributed, and transmits the distribution request to the map distribution server 200. The area information processing section 44 receives area information sent from the map distribution server 200 in accordance with the distribution request. The area information processing section 44 also displays the content of the area information. The area information is map area information that shows a geographical area corresponding to an update that can be transmitted in a single transmission operation satisfying the distribution conditions designated by the navigation apparatus 100. As described above, the map data for the update includes different types of data, such as the map image data, the POI data, and the road data. When displaying the above-mentioned map area information, the type of data is shown at the same time. A more specific display example will be described below. When the user selects a map area whose update is required by the user, the download processing section 46 downloads the update corresponding to the map area in accordance with the display content of the area information sent from the map distribution server 200.

The update downloaded by the map data updating unit 40 is stored in the update storing unit 50. If the update stored in the update storing unit 50 overlaps with the map data stored in the map buffer 10, part of the map data stored in the map buffer 10 is replaced with the update, and then various types of processing, such as map display, POI search, and route search, are performed. The update storing unit 50 includes a semiconductor memory, a hard disc drive, or the like.

The communication processing unit 52 performs processing required for the navigation apparatus 100 to perform various types of data communication, such as transferring an update request, area information, and an update, with the map distribution server 200 through the network 300. A mobile telephone (not shown) is externally attached to the communication processing unit 52.

The input processing unit 60 supplies commands to units of the navigation controller 1 so that the units operate in accordance with various operation instructions received from the remote-control device 4. The map image drawing data produced by the map drawing unit 14 is supplied to the display processing unit 70. The display processing unit 70 displays a map image within a predetermined area on the display screen of the display device 6 in accordance with the drawing data. The search result image data produced by the POI searching unit 36 and the guidance route drawing data produced by the guidance route drawing unit 32 are supplied to the display processing unit 70. The display processing unit 70 displays these drawing data so as to be superimposed on the map image on the display screen of the display device 6.

The detailed structure of the map distribution server 200 will now be described. Referring to FIG. 1, the map distribution server 200 includes a server control unit 210, a map database 220, and a communication processing unit 230.

The server control unit 210 controls the entire map distribution server 200 to distribute an update to the navigation apparatus 100. The server control unit 210 includes a distribution request receiving section 212, an area information producing section 214, and a distribution data transmitting section 216. The server control unit 210 functions as a computer including a CPU, a ROM, a RAM, and the like. The server control unit 210 executes a predetermined program stored in the ROM or the RAM to perform a predetermined control operation.

The distribution request receiving section 212 receives the distribution request from the navigation apparatus 100 and analyzes the distribution conditions included in the distribution request. The area information producing section 214 produces area information in accordance with the distribution conditions. When the map area to be downloaded is specified in accordance with the area information transmitted to the navigation apparatus 100, the distribution data transmitting section 216 transmits distribution data (an update) corresponding to the specified map area to the navigation apparatus 100.

The latest map data is stored in the map database 220. The map data includes map drawing data used for map drawing processing, POI data used for displaying POI information, POI searching, and the like, and road data used for route search processing.

The communication processing unit 230 performs processing required for the map distribution server 200 to perform data communication with the navigation apparatus 100 through the network 300.

The distribution request processing section 42 corresponds to a distribution request transmitting section. The area information processing section 44 corresponds to an area information displaying section. The download processing section 46 corresponds to a distribution instruction transmitting section and a map data receiving section. Also, the distribution request receiving section 212 and the area information producing section 214 correspond to an area information transmitting section and the distribution data transmitting section 216 corresponds to a map data transmitting section.

The map data distribution system according to this embodiment has the structure described above. The operation of the map data distribution system will now be described.

Operation of Navigation Apparatus

Figure 3:
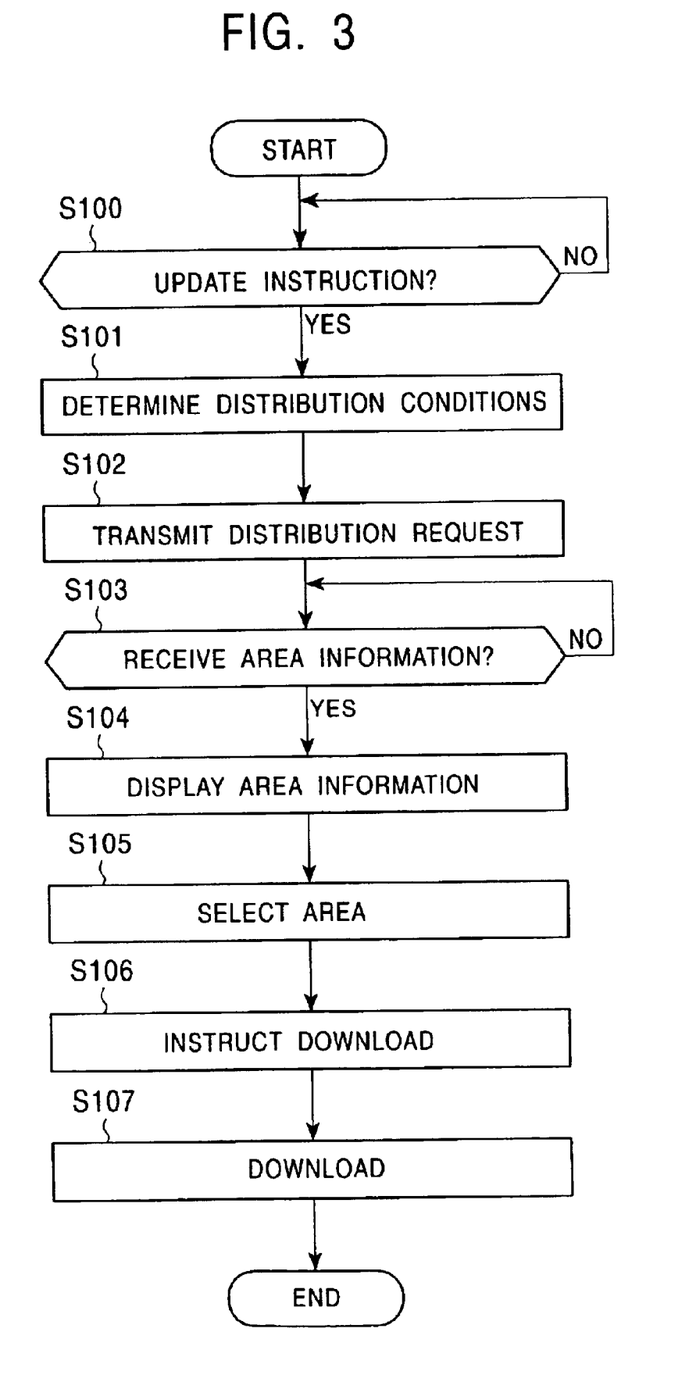
FIG. 3 is a flowchart of steps performed by the navigation apparatus.

FIG. 3 is a flowchart of steps performed by the navigation apparatus 100. FIG. 3 mainly shows a series of steps relating to acquisition of an update by the map data updating unit 40.

The distribution request processing section 42 determines whether or not an update instruction for map data is given (step S100). If the update instruction is not given, the determination in step S100 is negative, and step S100 is repeated. The update instruction may be, for example, given by a predetermined operation performed by the user or given automatically at a time determined by the user if the user sets data to be updated periodically (for example, once a month).

If the update instruction is given, the determination in step S100 is affirmative. Then, the distribution request processing section 42 determines the distribution conditions (step S101)

and transmits a distribution request including the distribution conditions to the map distribution server 200 (step S102). The distribution conditions included in the distribution request include the minimum distribution amount that can be acquired in a single downloading operation. For example, the downloading time, fee, or data size is designated as the distribution amount. The user designates the distribution amount by entering the distribution amount on a predetermined setting screen in advance. Alternatively, the user designates the distribution amount by entering the distribution amount on a setting screen every time the user instructs an update. The distribution request also includes data on the current vehicle position (including latitude and longitude) and data on the date of the last update corresponding to the vehicle position data.

After the transmission of the distribution request, the area information processing section 44 determines whether or not the area information processing section 44 receives area information from the map distribution server 200 (step S103). If the area information processing section 44 does not receive the area information, the determination in step S103 is negative and step S103 is repeated until the area information processing section 44 receives the area information. If the area information processing section 44 receives the area information, the determination in step S103 is affirmative. The area information processing section 44 displays the content of the area information (step S104). The area information includes map area information showing a geographical area of an update that can be transmitted in a single transmission operation based on the distribution amount designated in the distribution conditions. The area information also includes the type of update for each map area created by dividing in accordance with the map area information. The area information processing section 44 displays each of the map areas so as to be superimposed on the map image. Also, the area information processing section 44 displays character information that represents the type of update for each of the map areas and colors the map areas differently depending on the type of the update.

Figure 4:
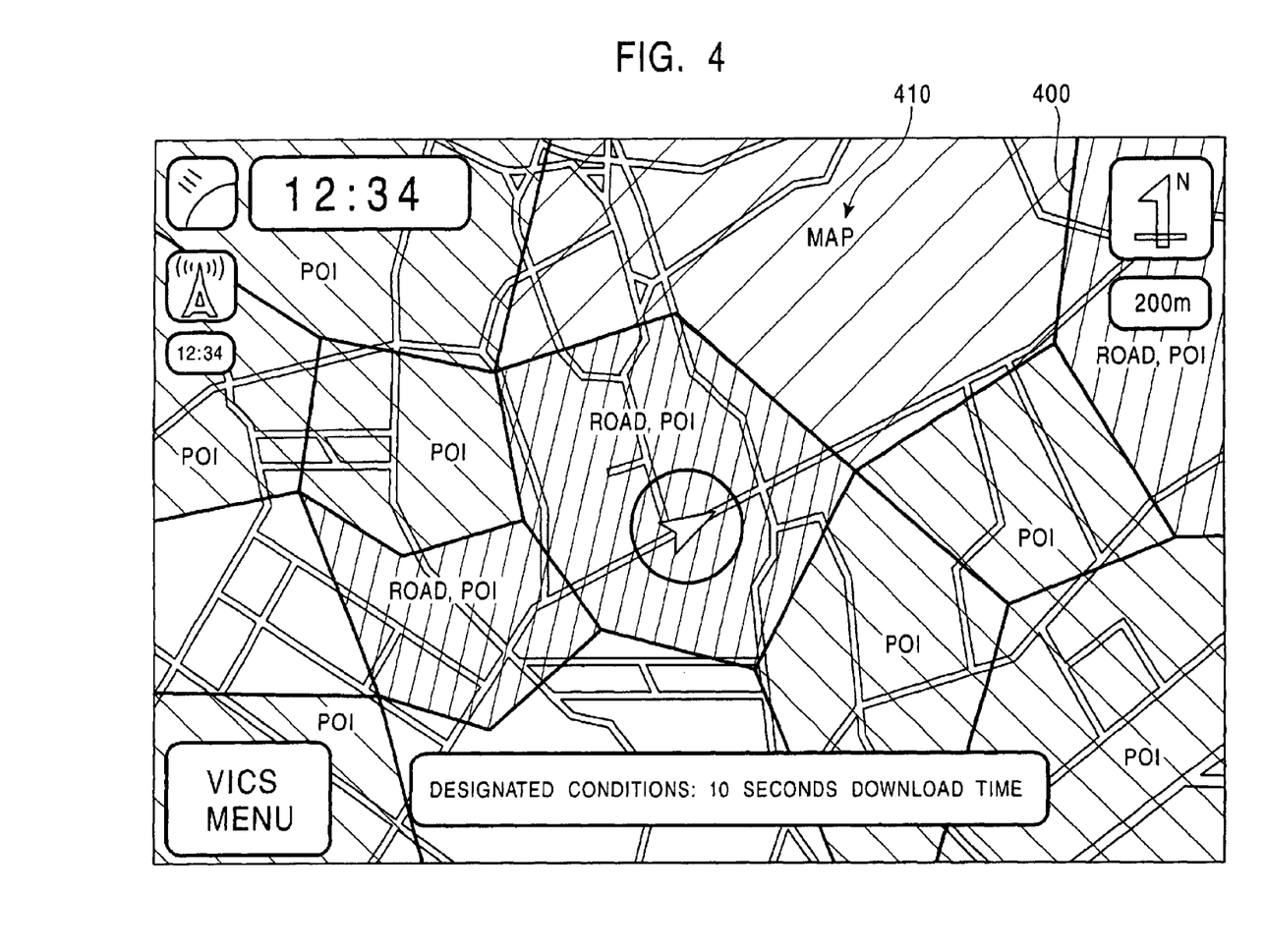
FIG. 4 shows a display example of area information.

FIG. 4 shows a display example of the area information. Partition lines 400 and character information 410 are displayed so as to be superimposed on the map image around the vehicle position. Map areas are partitioned by the partition lines 400 that are determined in accordance with the area information, and the character information 410 shows the type of update for each of the map areas. For example, the character information 410 is represented by characters, such as "MAP", "ROAD", or "POI", depending on the type of the update. "MAP" represents map image data, "ROAD" represents road data, and "POI" represents point-of-interest (POI) data. If different types of updates are assigned to one map area, two items of the character information 410 are displayed together on the map area. Each of the map areas is colored in accordance with the content of the character information 410 (the type of the update). In FIG. 4, color differences of the map areas are represented by different types of hatching. As described above, each of the map areas is displayed with a color depending on the type of the update. Thus, the user only needs to glance at the display in order to understand the type and geographical area of the update, without reading the content of the character information 410.

After displaying the area information, one or more map areas are selected (step S105). Each of the map areas shown in FIG. 4 represents a geographical area of an update that can be transmitted in a single transmission operation that satisfies the distribution conditions included in the distribution request, and the type of the update is displayed in each of the map areas. From the map areas displayed, the user selects one or more map areas including an update whose distribution is required by the user. If the user selects one map area, the user desires that an update corresponding to the distribution amount included in the distribution conditions (for example, in FIG. 4, the downloading time is set to ten seconds) be distributed. If the user selects n map areas, the user desires that an update corresponding to an amount n times the distribution amount be distributed. The user can select one or more map areas by operating the joystick included in the remote-control device 4 while moving a cursor position and pressing the "set key". Alternatively, if the user assigns a number to each of the map areas in advance, the user may select one or more map areas by directly designating a map area number corresponding to the desired map area on a numeric key pad included in the remote-control device 4.

After the selection of one or more map areas including an update whose distribution is required by the user, the download processing section 46 transmits a download instruction including map area specification information for specifying the selected map area to the map distribution server 200 (step S106). The update corresponding to the downloading instruction is transmitted from the map distribution server 200, and the download processing section 46 downloads the update (step S107).

As described above, a series of downloading operations are performed in the navigation apparatus 100, and the distributed update is stored in the update storing unit 50.

Operation of Map Distribution Server

Figure 5:
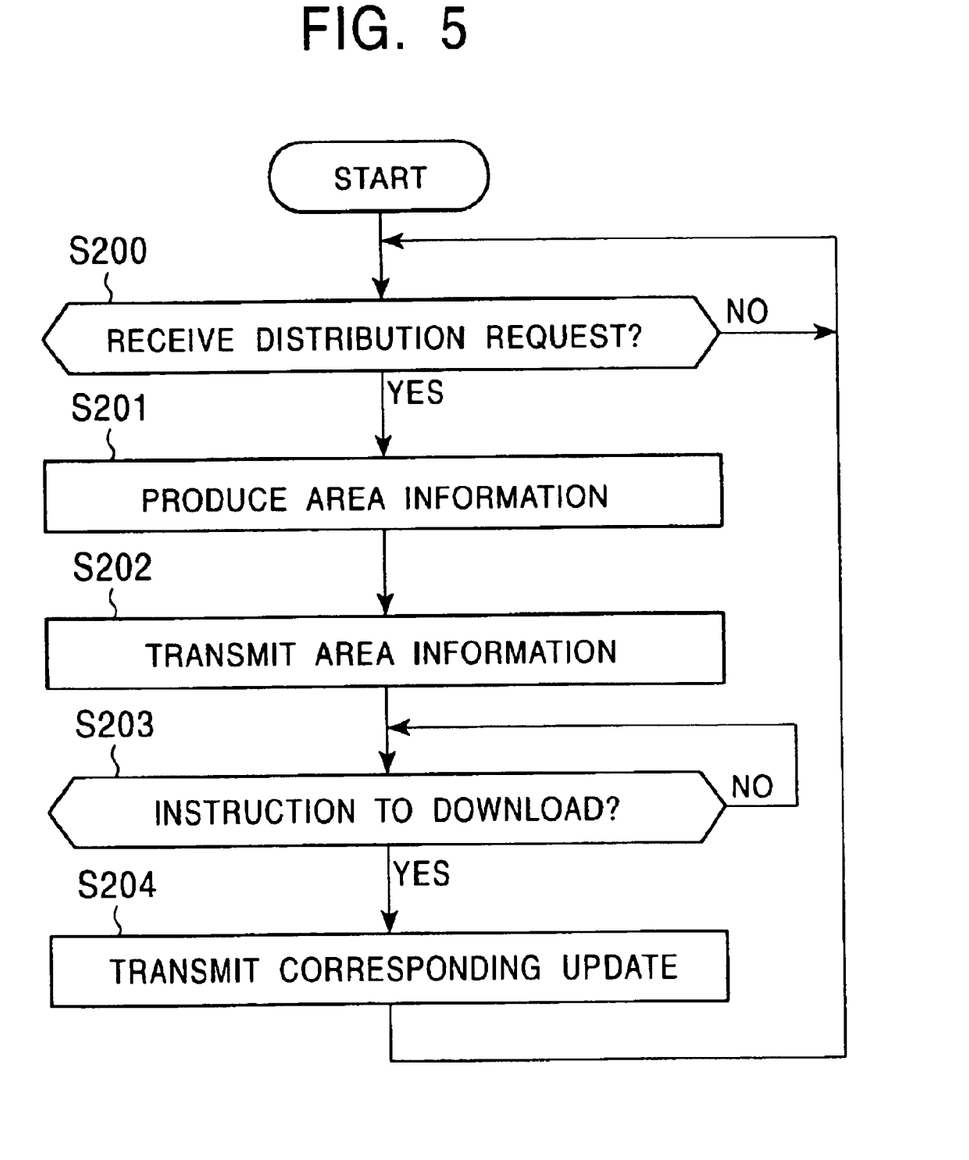
FIG. 5 is a flowchart of steps performed by a map distribution server.

FIG. 5 is a flowchart of steps performed by the map distribution server 200. The distribution request receiving section 212 determines whether or not the distribution request receiving section 212 receives the distribution request from the navigation apparatus 100 (in step S200). If the distribution request receiving section 212 does not receive the distribution request, the determination in step S200 is negative and step S200 is repeated until the distribution request receiving section 212 receives the distribution request. If the distribution request receiving section 212 receives the distribution request, the determination in step S200 is affirmative. The area information producing section 214 produces area information corresponding to a predetermined region near a position specified by the vehicle position data included in the distribution request received from the navigation apparatus 100 (in step S201). More specifically, in accordance with the data on the date of the last update included in the distribution request, the area information producing section 214 extracts the part of the map data that has been updated during the period from the last update time to the present as an update. Then, the area information producing section 214 gradually expands the size of the map area centered on the position specified by the vehicle position data and determines the maximum size of the map area whose corresponding update does not exceed the distribution amount included in the distribution conditions. When the size of the map area centered on the vehicle position is determined, the sizes of the map areas around the map area centered on the vehicle position are also determined in such a manner that the updates corresponding to the map areas do not exceed the distribution amount included in the distribution conditions. Accordingly, each of the map areas shown in FIG. 4 is determined. Also, in the process of determining the sizes of the map areas, the types of map data corresponding to the map areas are determined.

The area information producing section 214 transmits the area information produced as described above to the navigation apparatus 100 from which the distribution request was transmitted (step S202).

The distribution data transmitting section 216 determines whether or not the downloading instruction transmitted from the navigation apparatus 100 is received (step S203). If the downloading instruction is not received, the determination in step S203 is negative and the step S203 is repeated. If the downloading instruction is received, the determination in step S203 is affirmative. The distribution data transmitting section 216 reads an update to be distributed from the map database 220 in accordance with the map area specification information included in the downloading instruction and transmits the update to the navigation apparatus 100 (step S204).

The series of operations for distributing an update from the map distribution server 200 to the navigation apparatus 100, as described above, are then terminated.

As described above, in the map data distribution system according to this embodiment, the navigation apparatus 100 transmits a distribution request including distribution conditions, so that map data satisfying the distribution conditions can be distributed from the map distribution server 200. Thus, users can obtain an update under desired conditions. In particular, the distribution amount designated in the distribution conditions determines the desired amount of data and desired communication time and thus allows the users to obtain only the necessary update.

In the map data distribution system according to this embodiment, a map area representing a geographical area of an update that can be transmitted in a single distributing operation satisfying the distribution conditions is displayed. Also, character information representing the type of the update is displayed in each map area, which is colored differently depending on the type of the update. Thus, before downloading, the users can easily understand the type of the updated map data.

The present invention is not limited to the embodiment described above and various modifications may be made to the present invention without departing from the spirit and the scope of the present invention. For example, although an update corresponding to an updated part of the map data held in the navigation apparatus 100 is distributed in the embodiment described above, the present invention can also be applied to a case where new map data is distributed.

Also, although map data is stored on the DVD 2, which is a read-only storage medium, in the embodiment described above, map data may be stored in a hard disc drive, which is a read/write storage medium. In such a case, a downloaded update may be directly written to the hard disc drive so that the update is written over the unnecessary part of the map data.

What is claimed is:

1. A map data distribution system comprising:
a navigation apparatus comprising a distribution request transmitting section, a map data receiving section, an area information displaying section, and a distribution instruction transmitting section; and
a map distribution server comprising a map data transmitting section,
wherein the navigation apparatus is connected in communication with the map distribution server through a predetermined network; the distribution request transmitting section transmits a distribution request to the map distribution server, the distribution request including distribution conditions relating to the amount of map data to be distributed; the map data transmitting section transmits the map data satisfying the distribution conditions included in the distribution request; and the map data receiving section receives map data that satisfies the distribution conditions and that is sent in accordance with the distribution request;
the map distribution server further comprising an area information transmitting section that, before the map data transmitting section transmits the map data, transmits area information showing a geographical area of the map data that is transmittable under the distribution conditions; the area information displaying section visually displays the geographical area of the map data that is receivable under the distribution conditions, in accordance with the area information transmitted from the man distribution server; and when an instruction to distribute the map data is given by a user after the display processing is performed by the area information displaying section, the distribution instruction transmitting section transmits the distribution instruction to the map distribution server, and the map data transmitting section transmits the map data after receiving the distribution instruction.

2. A map data distribution system according to claim 1, wherein the area information displaying section displays map area information showing a geographical area corresponding to the map data that is transmittable in a single transmission operation under the distribution conditions, the map area information being superimposed on the map.

3. A map data distribution system according to claim 2, wherein the map data transmitted from the map distribution server to the navigation apparatus comprises an update to map data held in the navigation apparatus.

4. A map data distribution system according to claim 3, wherein the update is classified into different types depending on their uses, and the area information displaying section displays the map area information and the type of the update.

5. A map data distribution system according to claim 4, wherein the type of the update is displayed using characters.

6. A map data distribution system according to claim 4, wherein the area information displaying section displays each area corresponding to the map area information in a color in accordance with the type of the update.

7. A navigation apparatus comprising:
a distribution request transmitting section;
a map data receiving section;
an area information displaying section; and
a distribution instruction transmitting section;
wherein the navigation apparatus is connected in communication with a map distribution server through a predetermined network and receives map data from the map distribution server; the distribution request transmitting section transmits a distribution request to the map distribution server, the distribution request including distribution conditions relating to the amount of the map data to be distributed; and the map data receiving section receives the map data that satisfies the distribution conditions and that is sent in accordance with the distribution request;
wherein area information showing a geographical area of the map data that is transmittable under the distribution conditions is transmitted from the map distribution server prior to transmission of the map data, and the area information displaying section visually displays the geographical area of the map data that is receivable under the distribution conditions, in accordance with the area information; and when an instruction to distribute the map data is given by a user after the display processing is performed by the area information displaying section, the distribution instruction transmitting section transmits the distribution instruction to the map distribution server.

8. A navigation apparatus according to claim 7, wherein the area information displaying section displays map area information showing a geographical area corresponding to the map data that is transmittable in a single transmission operation under the distribution conditions, the map area information being superimposed on the map.

9. A map data updating method for downloading map data from a map distribution server through a predetermined network and updating map data in a navigation apparatus, comprising:

transmitting, by the navigation apparatus, a distribution request to the map distribution server, the distribution request including distribution conditions relating to the amount of map data to be distributed;

transmitting, by the map distribution server, map data satisfying the distribution conditions included in the distribution request to the navigation apparatus; and receiving, by the navigation apparatus, the map data satisfying the distribution conditions transmitted from the map distribution server;

wherein the map distribution server transmits area information to the navigation apparatus before transmitting the map data, the area information showing a geographical area of the map data that is transmittable under the distribution conditions; the navigation apparatus visually displays the geographical area of the man data that is receivable under the distribution conditions, in accordance with the area information transmitted from the man distribution server; and when an instruction to distribute the map data is given by a user after the display processing is performed, the navigation apparatus transmits the distribution instruction to the map distribution server, and the map distribution server transmits the map data after receiving the distribution instruction.

10. A map data updating method according to claim 9, wherein the navigation apparatus displays map area information showing a geographical area corresponding to the map data that is transmittable in a single transmission operation under the distribution conditions, the map area information being superimposed on the map.

11. A map data updating method according to claim 10, wherein the map data transmitted from the map distribution server comprises an update to map data held in the navigation apparatus.

12. A map data updating method according to claim 11, wherein the navigation apparatus classifies the update into different types depending on their uses, and the navigation apparatus displays the map area information and the type of the update.

13. A map data updating method according to claim 12, wherein the navigation apparatus displays the type of the update using characters.

14. A map data updating method according to claim 12, wherein the navigation apparatus displays each area corresponding to the map area information in a color in accordance with the type of the update.

* * * * *

UNITED STATES PATENT AND TRADEMARK OFFICE
CERTIFICATE OF CORRECTION

PATENT NO. : 6,915,206 B2  Page 1 of 1
APPLICATION NO. : 10/611008
DATED : July 5, 2005
INVENTOR(S) : Akihiko Sasajima It is certified that error appears in the above-identified patent and that said Letters Patent is hereby corrected as shown below:

Column 10, in claim 1, line 17, before "distribution server," delete "man" and substitute --map-- in its place.

Column 11, in claim 9, line 33, after "geographical area of the" delete "man" and substitute --map-- in its place.

Column 12, in claim 9, line 3, before "distribution server," delete "man" and substitute --map-- in its place.

Signed and Sealed this

Seventh Day of November, 2006

JON W. DUDAS
*Director of the United States Patent and Trademark Office*